UNITED STATES PATENT OFFICE.

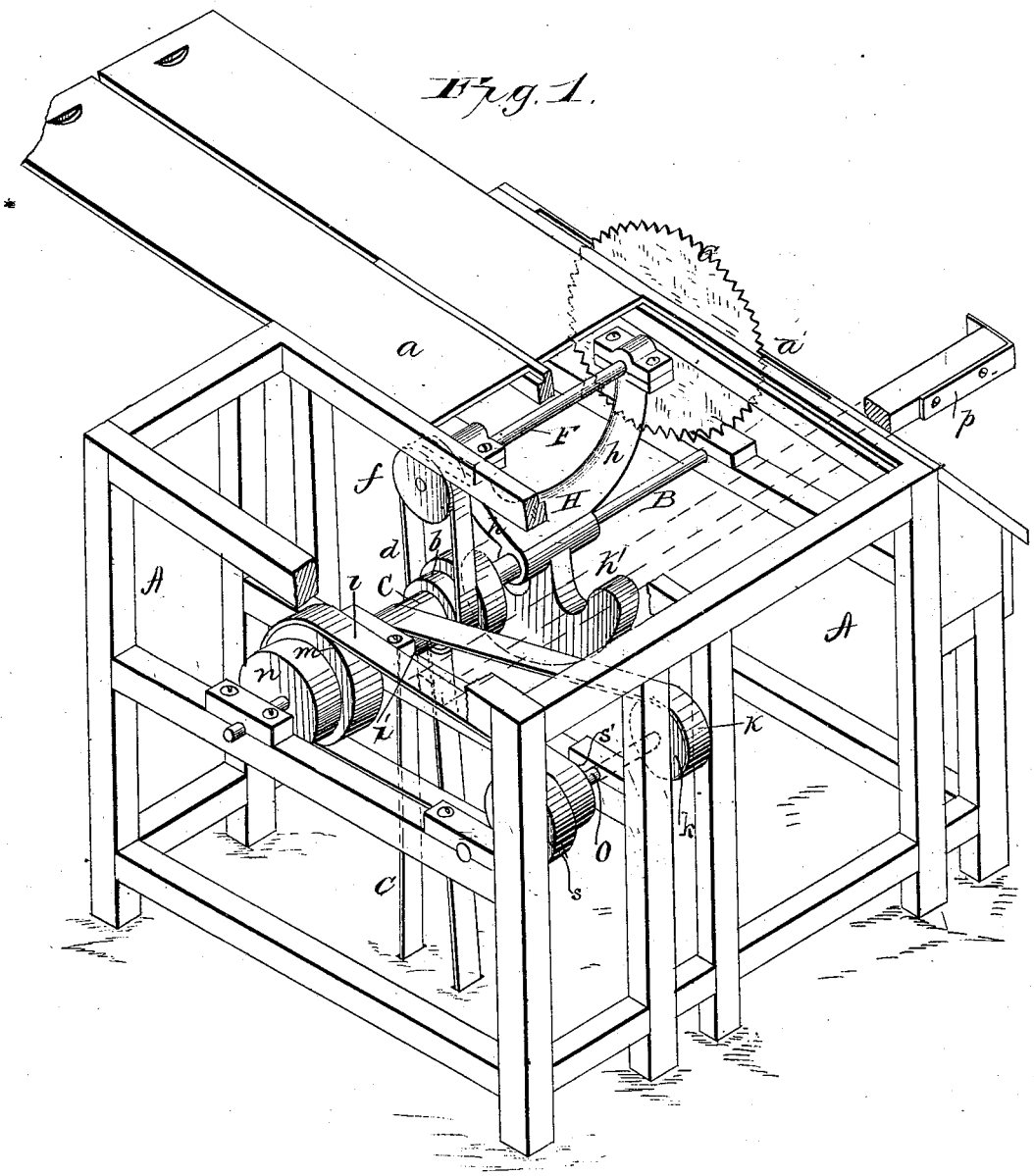

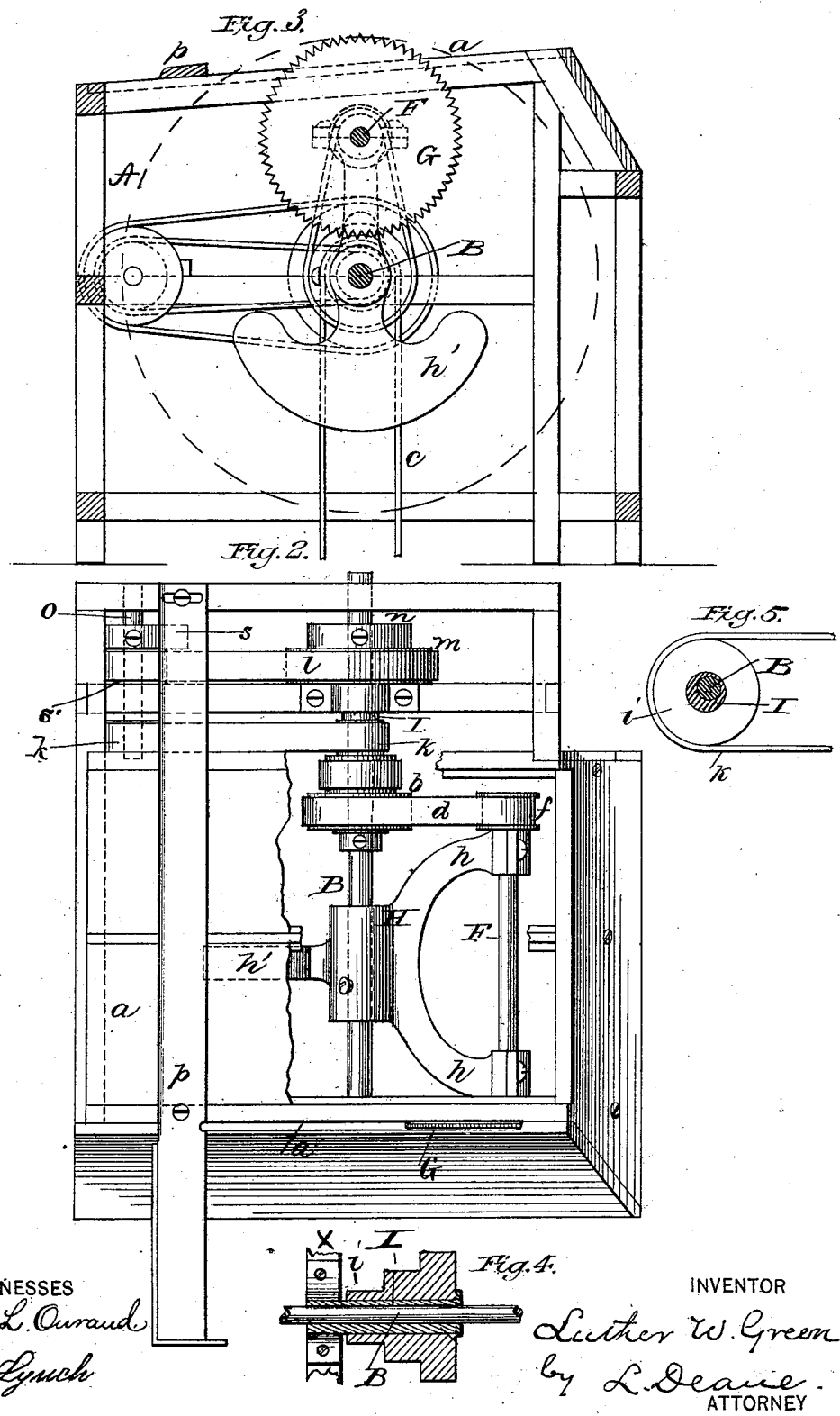

LUTHER W. GREEN, OF WILLIAMSPORT, PENNSYLVANIA.

ROTARY CUT-OFF SAW.

SPECIFICATION forming part of Letters Patent No. 228,886, dated June 15, 1880.

Application filed February 20, 1880.

*To all whom it may concern:*

Be it known that I, LUTHER W. GREEN, a citizen of the United States, residing at Williamsport, in the county of Lycoming and State of Pennsylvania, have invented certain new and useful Improvements in Rotary Cut-Off Saws; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a perspective view of the entire device. Fig. 2 is a top plan of the device. Fig. 3 is a side elevation of the saw mounted on the shaft by which it is revolved and on that which gives it rotary motion. Figs. 4 and 5 are details, showing, in section and elevation, the cam-shaped bearing which causes the saw to bite when it comes in contact with the wood.

This invention pertains to improvements in revolving cut-off saws.

In the accompanying drawings, A denotes any mill or saw frame, and B the main shaft. A step-pulley is loosely placed on the cam-sleeve I, which is rigidly fixed to a cross-girt, $x$, of the frame, and this pulley takes its motion from the belt C, connecting with the counter-shaft of any suitable motive power. This motion is carried by the belt $d$ on pulley $b$ to the pulley $f$ on the axis F of the circular saw G, which saw is fixed on the axis or shaft F at the end opposite the pulley $f$. This saw is mounted on the shaft B by means of the frame H, which is rigidly fixed on said shaft. This frame carries in its arms $h$ the shaft or axis F of the saw. The shaft B passes through the frame H in such manner that its bob or lower part, $h'$, which is quite heavy, will form a counter-balance to the frame.

The main shaft B will be revolved by means of the belt $l$, which runs over step-pulleys $m\,n$ and $s\,s'$, the former being fast to shaft B, while the latter is keyed to shaft O. On the same shaft O is also a pulley, $k$, which receives motion from pulley $i$ through belt K. The revolution of this main shaft B will rotate the frame H, carrying the saw, and during a portion of this rotation a part of the saw-disk is brought above the inclined bed $a$ of the machine through the slot $a'$. The peculiar relation of this bed to the saw by reason of this inclination will tend to cause the saw to present its cutting-edge to the board or stuff to be cut in the most effective manner from the beginning to the end of its path through the slot $a'$. Since the pulleys $b$ and $i$ and the one the belt runs on are loose on the cam-shaped sleeve I, which is rigidly fixed on the cross-girt, it will happen that while the saw in its rotation on the axis B is below the saw-bed it will move very slowly, if at all, on its shaft F, since the belt $d$, running on the smaller or thinner part of the cam-sleeve I, will not give much if any motion to the pulley; but when the edge of the saw begins to come above the bed of the machine the pulley $b$, now moving on the enlarged part of the cam-sleeve, will cause the belt $d$ to tighten, and this will make the saw revolve very rapidly. This motion will be kept up till the saw-edge has reached the end of the slot $a'$, where the pulleys $b$ will come to turn on the smaller part of the cam-sleeve, and this will slacken the belt $d$ and stop or very greatly reduce the motive power operating on the saw axis or shaft.

By means of the different-sized pulleys $s$ and $s'$ on the shaft O and pulleys $m$ and $n$ on the main shaft B, the speed of the shaft B, and also of the saw, can be regulated in the usual way.

It will be seen that by making the bed $a$ inclined downward more or less from the front to the rear part the boards or stuff to be sawed can be very easily and readily placed in position against the guide P to be cut or sawed.

By the present invention is afforded a most expeditious means for cutting or sawing box-stuff and similar lumber, as well as wood for other articles, and the wood or stuff can be fed upon the bed to be sawed while the saw is moving beneath it. In this way not only can the work be done much quicker, but much safer, than when the saw runs always above the bed-face; and by the peculiar and simple way in which the saw is mounted and revolved and rotated it will be found that its operation is not likely to be impeded by the disarrangement of belts or any part of the mechanism. The counter-balance on the saw-frame will add in a large degree to regulate the operation of the saw, not only in its cutting, but in the rotation and revolution.

Having thus described my invention, what

I consider new, and desire to secure by Letters Patent, is—

1. The combination of the circular saw G, fixed on the outer end of the shaft F, and operated by pulley $f$ and band $d$, as described, with the shaft B and rigidly-fixed cam-shaped sleeve I, whereby the saw is revolved at its greatest speed as it passes through slot $a'$ in its revolution on said shaft B, substantially as described.

2. In a sawing-machine having an inclined bed, $a$, the combination of the main shaft B, having the counterbalanced frame H, carrying the saw-shaft F and saw G, with the pulleys $f$ and $b$ and belt $d$, operating the saw-shaft and cam-sleeve I on said shaft B, and belts $k$ and $l$, and their pulleys, conveying the motion of the belt C, substantially as described.

3. In a sawing-machine substantially as described, the combination of a rotating saw, mounted in and revolved on a counterbalanced frame rigidly fixed on the main shaft, with pulleys and gearing attached to its own shaft and the main shaft at the end opposite the saw, whereby efficiency of operation is secured and all danger of interruption in the belts and like parts is obviated, substantially as described.

In testimony whereof I affix my signature in presence of two witnesses.

LUTHER W. GREEN.

Witnesses:
CLINTON LLOYD,
JOHN ARTHUR.